United States Patent [19]

Deshais et al.

[11] 4,286,926
[45] Sep. 1, 1981

[54] CONDUCTION PUMP FOR LIQUID METAL

[75] Inventors: Richard Deshais, Paris; Henri Carbonnel, Antony, both of France

[73] Assignee: Novatome, Le Plessis Robinson, France

[21] Appl. No.: 90,081

[22] Filed: Oct. 31, 1979

[30] Foreign Application Priority Data

Nov. 15, 1978 [FR] France ............................. 78 32279

[51] Int. Cl.³ ............................................... H02N 4/20
[52] U.S. Cl. ................................................ 417/50
[58] Field of Search .......................... 417/50; 310/11

[56] References Cited

U.S. PATENT DOCUMENTS

| 3,287,677 | 11/1966 | Mohr | 417/50 X |
| 3,785,744 | 1/1974 | Carbonnel | 417/50 |
| 3,837,763 | 9/1974 | Ertaud et al. | 417/50 |
| 3,973,878 | 8/1976 | Le Frère | 417/50 |

FOREIGN PATENT DOCUMENTS 2293101 6/1976 France ...................................... 417/50

Primary Examiner—Carlton R. Croyle
Assistant Examiner—Edward Look
Attorney, Agent, or Firm—Haseltine & Lake

[57] ABSTRACT

The invention relates to a conduction pump for liquid metal.

This pump comprises a magnetic circuit for creating a magnetic field in the stream of liquid metal circulating in a pipe, and a turn, filled with liquid metal, for supplying an electric current perpendicular to the magnetic field in the stream of liquid metal. The turn is arranged at the level of the gap zone of the magnetic circuit, perpendicular to the field in this gap, and at least partially surrounds the magnetic circuit so that the electric current is generated in the turn by the circuit. The turn is at least partially formed by the circulation pipe itself.

The invention is applied in particular to the conveying of liquid aluminium by pumping.

4 Claims, 5 Drawing Figures

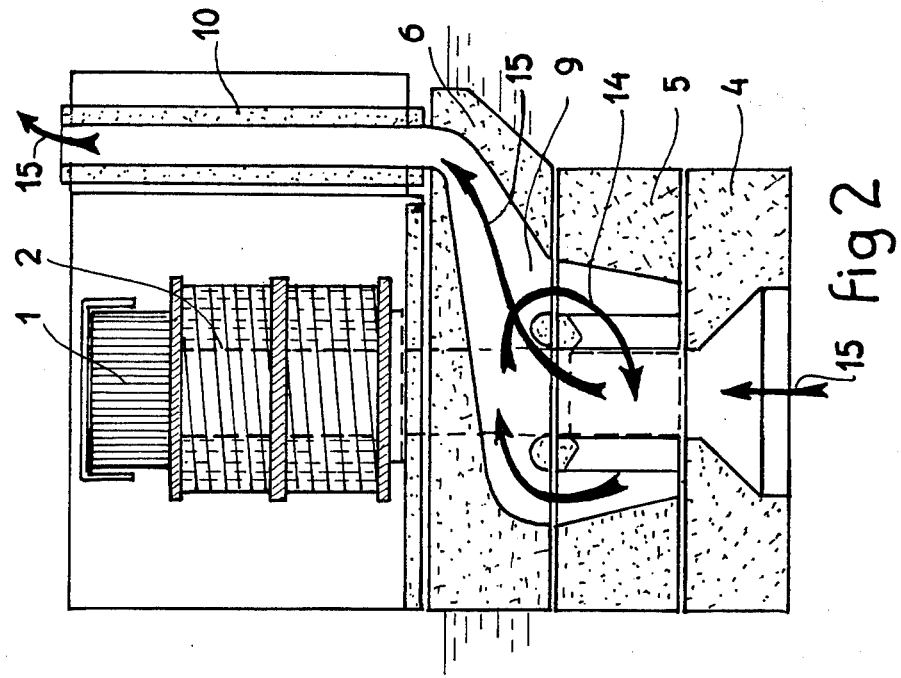
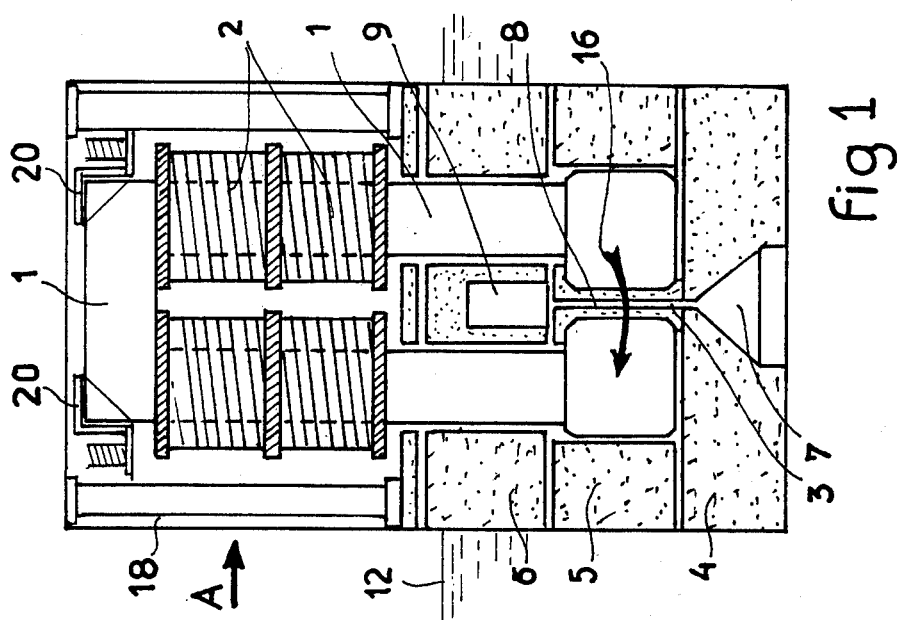

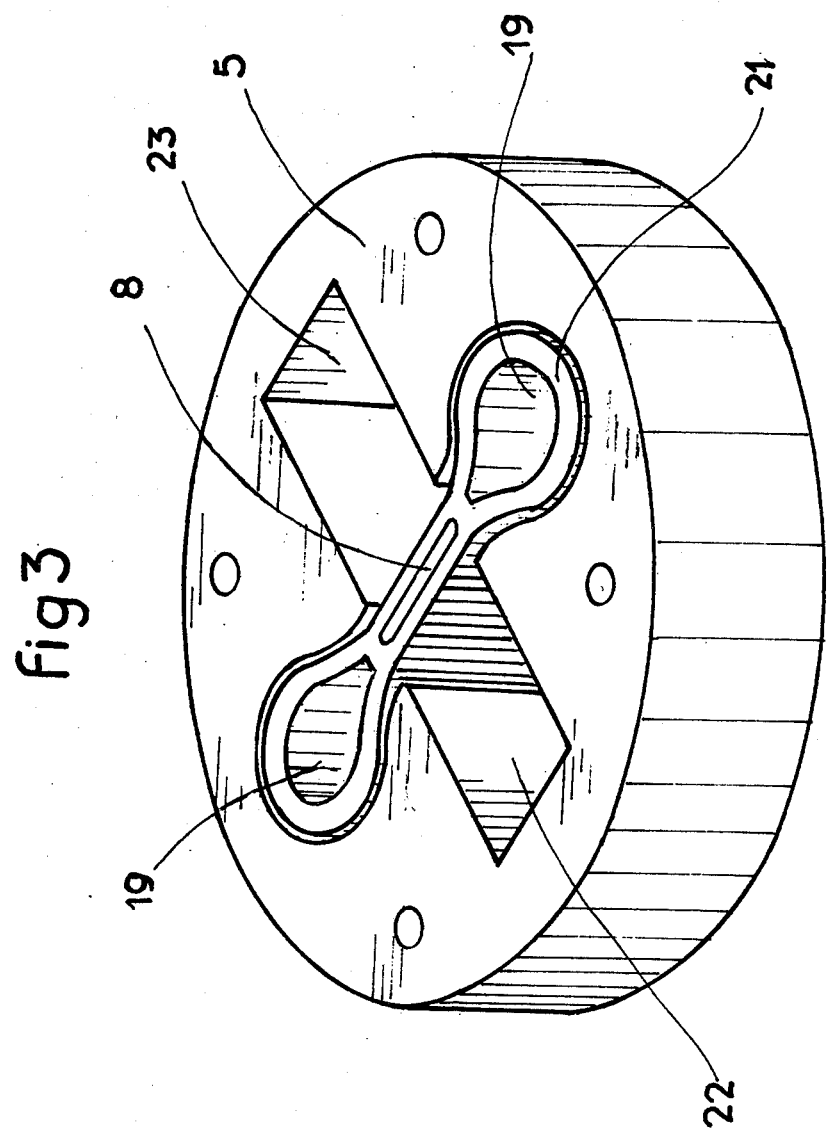

CONDUCTION PUMP FOR LIQUID METAL

The invention relates to a conduction pump for liquid metal, that is to say a pump in which the liquid metal is circulated under the effect of a magnetic field and an electric current which are mutually perpendicular and pass through the stream of metal.

Conduction pumps of this type, which are useful for conveying liquid metal, for example aluminium, generally comprise a magnetic circuit, for creating the field passing through the stream of metal, and a turn made of refractory material, inside which liquid metal is in electrical contact with the stream of metal to be circulated, at the level of the zone subjected to the magnetic field.

A current is induced in the stream of liquid metal by means of a second magnetic circuit, one branch of which is surrounded by the turn which consists of a refractory block and is filled with liquid metal.

In order to generate the magnetic field and induce the current in the turn, each of the magnetic circuits is provided with a winding which can be fed with alternating current.

Feeding the two windings with currents which are approximately in phase makes it possible to create, at the level of the stream of liquid metal, a magnetic field and a current which pass through this stream and are approximately perpendicular and in phase. The electrical contact between the liquid metal present in the turn, inside which metal the electric current flows, and the stream of liquid metal, which is bounded by a circulation pipe passing through the gap in the magnetic circuit intended for creating the field, can be ensured by means of blocks of a refractory material which has been rendered conductive by impregnation with metal.

Direct contact between the liquid metal in the turn and the liquid metal to be conveyed in the pipe can also be achieved by means of perforated nozzles which make it possible to join the turn and the pipe.

In all cases, the conduction pump comprises a part made of refractory material, which is immersed in the liquid metal to be conveyed and which forms a circulation pipe for the metal passing through the gap in the circuit intended for creating the magnetic field.

Although isolated from the liquid metal by refractory material, part of the magnetic circuit is nevertheless located near this liquid metal, with the result that the magnetic circuit is caused to operate at high temperature.

Therefore, for constructing the magnetic circuit used in the conduction pumps, it is necessary to use magnetic products suitable for high temperatures; such products are very expensive because they involve the use of cobalt and require a protective treatment for each of the individual sheets forming the circuit.

The known type of conduction pump, comprising two magnetic circuits, is therefore relatively expensive and this restricts the possible applications thereof.

Furthermore, the need to have a turn of refractory material, filled with liquid metal, for creating the electric current passing through the stream of liquid metal in circulation, exhibits disadvantages which arise from the fact that this turn possesses a certain electrical resistance, which cannot be ignored, and fouls up during use, with the result that it is necessary to clean the turn and hence to dismantle the conduction pump.

The efficiency of the pump, relative to the electrical power supplied, and the ease with which it is maintained are therefore somewhat impaired, despite the fact that these conduction pumps are otherwise completely satisfactory.

A pump for liquid metals is also known, which involves the use of a single magnetic circuit for creating the field passing through the stream of metal and the current induced in the turn. However, this pump employs a gap in which the field is vertical and in which the current supplied by the turn passes through the stream of liquid metal horizontally, with the result that the metal is pumped horizontally into a compression chamber which is itself connected to an inclined pipe for discharging the liquid metal upwards.

The liquid metal has a complex path with a change of direction, whereby the efficiency of the pump is reduced.

The object of the invention is therefore to propose a conduction pump for liquid metal, comprising a part made of refractory material, which part is immersed in the liquid metal and forms a pipe for the circulation of this metal under the effect of a magnetic field and an electric current which are mutually perpendicular at the point where they pass through the stream of metal bounded by the pipe, the magnetic field being generated in the gap in a magnetic circuit and the current being supplied to the stream of liquid metal by means of a turn containing the liquid metal, which turn communicates directly with the circulation pipe at the level of the gap zone, is arranged perpendicular to the field in this gap and at least partially surrounds the circuit so that the electric current is generated in the turn by the circuit, this conduction pump being inexpensive and of simple construction, whilst at the same time being very efficient and very easy to maintain.

For this purpose, the magnetic field in the gap is horizontal and the vertical turn is at least partially formed by the circulation pipe itself, which is arranged vertically at the level of the gap.

In order to provide a clear understanding of the invention, a conduction pump and also a modified embodiment of this pump according to the invention will now be described by way of non-limiting examples.

FIG. 1 shows a view in elevation of the pump, with a partial section through a vertical plane.

FIG. 2 shows a view in elevation of the same pump, along A of FIG. 1, with a partial section of this pump through a vertical plane perpendicular to the plane of the section of FIG. 1.

FIG. 3 shows, in perspective, one of the pieces of the pump which are made of refractory material, according to a modified embodiment.

Figure 5:
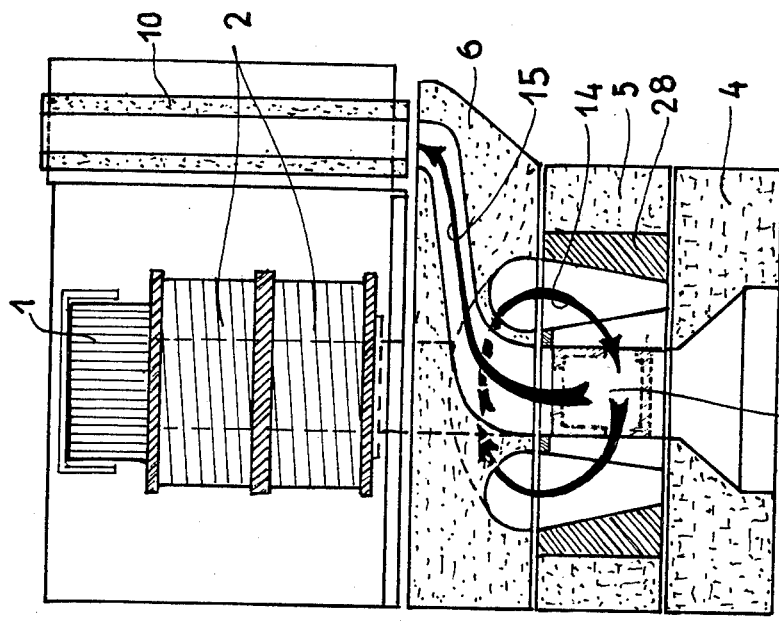
FIGS. 4 and 5 show a view in elevation of the pump, with a partial section of this pump, showing a modified embodiment in which the return circuits for the current in the turn are separate from the pipe for discharging the metal.

FIGS. 1 and 2 show the magnetic circuit 1 of the pump, which circuit is equipped with coils 2 which can be fed with alternating current so as to create an induction in the C-shaped magnetic circuit and thus to create a horizontal magnetic field at the level of the gap 3 formed between the two branches of the circuit.

The magnetic circuit is laminated and consists of sheets of a cobalt-based magnetic alloy suitable for high temperatures.

The lower part of this circuit, comprising the gap 3, penetrates into pieces 4, 5 and 6, made of refractory material, which, when the pump is in service, are located below the surface 12 of the liquid metal which it is desired to convey by means of the pump.

The lower piece 4 possesses a suction orifice 7 which opens out into the liquid metal and communicates with a channel 8, of flat shape, arranged vertically at the level of the gap 3 inside the piece 5.

This vertical channel 8, of flat shape, itself communicates, at its upper part, with the upper pipe 9 for the liquid metal, which pipe is formed in the piece 6. The upper pipe 9 itself emerges in a vertical tube 10 of refractory material, which constitutes the outlet pipe for the liquid metal.

The recesses 7, 8 and 9 inside the pieces 4, 5 and 6 respectively constitute, together with the tube 10 of refractory material, the circulation pipe for the liquid metal during pumping.

Furthermore, FIG. 2 shows that the internal structure of the recesses 8 and 9 in the pieces 5 and 6 forms a turn 14, which is filled with liquid metal and is arranged around the circuit 1, at the level of the gap 3 and perpendicular to the field in this gap.

When the coils 2 of the circuit 1 are fed with alternating current, a current is therefore induced inside the turn 14, whilst a magnetic field, which is perpendicular to this current at the level of the channel 8 and is approximately in phase with the electric current, is generated by the same magnetic circuit.

The liquid metal entering through the orifice 7 is therefore subjected to a force directed upwards, at the level of the channel 8, which force causes the liquid metal to be pumped through the passage 7, 8, 9 and 10.

FIG. 2 shows the circulation of the liquid metal by means of arrows 15, whilst the direction of the magnetic field in the gap 3 is shown by an arrow 16 in FIG. 1.

The upper part 18 of the pump consists of an isolating housing, inside which the coils 2 are located, the housing 18 isolating the coils from the hot and corrosive liquid metal vapours which can rise above the level 12 of this metal.

The magnetic circuit and the coils are fixed inside the housing 18 by means of brackets 20 which enable the pump to be dismantled easily.

FIG. 3 shows a modified embodiment of the piece 5, inside which piece the lower part of the turn 19 is formed by a detachable refractory block 21 which houses, at its central part, the circulation channel 8 which is in communication with the lower part of the turn 19 at its lateral ends, for bringing the liquid metal in the turn into contact with the liquid metal in the pipe 8, so that the electric current created in the turn at the level of the gap 3 formed between the end branches of the magnetic circuit 1, of which the housings 22 and 23 are provided in the piece 5, passes through the pipe 8.

Thus, it is extremely easy to remove the turn when the pieces 4, 5 and 6 have been disassembled, during the maintenance of the pump for cleaning the turn which fouls up in contact with the liquid metal. Furthermore, replacing only the piece 21 is less expensive than replacing the entire piece 5.

Figure 4:
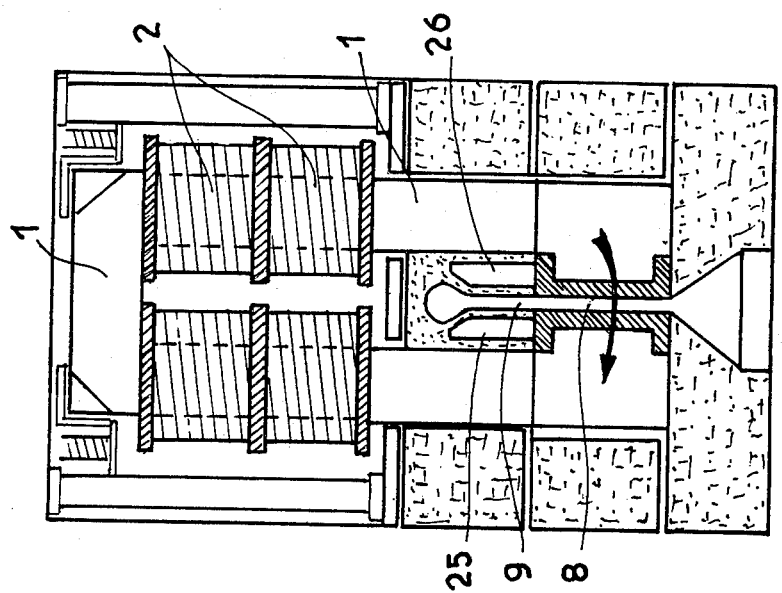

FIGS. 4 and 5, in which identical reference numbers indicate similar elements to those shown in FIGS. 1 and 2, show a modified embodiment of the pump, the pieces 5 and 6 having been designed in such a way that the circulation loop for the electric current is completed in pipes which are separate from the circulation pipe for the liquid metal.

The piece 6 delimits two pipes 25 and 26, which are separate from the central pipe 9 through which the liquid metal flows. The piece 5 possesses an internal structure 28 which delimits a central channel 8, in the extension of the pipe 9, and the parts of the turn which are enclosed between the channel 8 and the pipes 25 and 26.

The turn is therefore formed, at its end opposite the channel 8 in which the electric current is supplied to the liquid metal circulating in the direction of the arrow 15, by pipes which are totally isolated from the circulation pipe 9 for the liquid metal, in contrast to the embodiment shown in FIGS. 1 and 2, in which the circulation loop 14 for the electric current was completed inside the pipe 9 itself.

It is seen that the main advantages of the pump according to the invention are that it requires the use of only one magnetic circuit, with the consequent saving in terms of the expensive magnetic materials, that the magnetic field and the electric current in that part of the pipe which is at the level of the gap are automatically in phase, that the length of the turn which is incorporated over at least part of its length with the pipe for conveying the metal is greatly reduced, and that, consequently, the electrical resistance of this turn is reduced. The pump has a good efficiency and is simple to construct because the circulation of liquid metal takes place in the vertical direction at the level of the gap. Thus, during pumping, the circulation of the liquid metal does not suffer the substantial change of direction which takes place in a pipe of simple form. Finally, maintenance of the pump is facilitated by the fact that the fouling of the turn is reduced and that removal and cleaning thereof are particularly easy.

The invention is not restricted to the embodiment which has now been described; on the contrary, it includes all the variants, and points of detail can be modified without thereby going outside the scope of the invention. Thus, the pieces made of refractory material, which are located below the surface of the liquid metal and constitute the lower part of the pump, can be of a completely different form from that which has been described, and, in particular, the circulation turn for the electric current can be produced not only by the internal structure of these pieces or the arrangement, inside these pieces, of a detachable element forming part of the turn, but also in any other manner which makes it possible to produce a turn, filled with liquid metal, around part of the magnetic circuit. That part of the turn which is opposite the point where the electric current is supplied to the circulation pipe can be formed by one or more pipes which are isolated from the circulation pipe, or, on the other hand, by part of the circulation pipe itself.

The circulation pipe for the liquid metal can have any shape and pass through any number of refractory pieces forming the lower part of the pump.

What is claimed is:

1. A conduction pump for liquid metal comprising: a part of refractory material immersed in liquid metal defining a circulating pipe for said metal, in which one part is defined by a channel of flat shape where the metal circulates from bottom to top, said circulating pipe forming a vertical coil for liquid metal comprising a member in communication with the liquid metal circulating in said channel; a single magnetic circuit, having an air gap in the interior of which said channel passes and being surrounded at least partially by the coil, at the level of the air gap; at least another coil fed by alternating current creating a magnetic field in a horizontal direction in the air gap and causing circulation in said coil, of an induced current which circulates at the level of said channel in a horizontal direction perpendicular to the magnetic field and a vertical force which is directed toward the top, being produced by the joint action of said field and current, on the metal in said channel.

2. A conduction pump for liquid metal, according to claim 1, wherein: the immersed part of the pump is defined by a stack of pieces (4), (5) and (6) formed of refractory material comprising elements (7), (8) and (9) constituting the circulation pipe of the liquid metal.

3. A conduction pump according to claim 1, wherein: the coil (14) is defined by a member (9) of circulation pipe, having in its interior the circulation loop of the electric current.

4. A conduction pump according to either claims 1, 2 or 3, wherein: the coil of liquid metal comprises in addition to its part communicating with the metal circulating in said channel a member consisting of the liquid metal contained in at least one connecting channel separated from the circulation pipe of the liquid metal.

* * * * *